Patented Aug. 19, 1952

2,607,673

UNITED STATES PATENT OFFICE 2,607,673

TRITHIOCARBONATES AS PLANT DEFOLIANTS

Lyle D. Goodhue and Carolyn E. Tissol, Bartlesville, Okla., assignors to Phillips Petroleum Company, a corporation of Delaware No Drawing. Application April 21, 1950, Serial No. 157,402

16 Claims. (Cl. 71—2.6)

This invention relates to the use of sulfenyl and thiosulfenyl trithiocarbonates as plant defoliating agents.

We have now discovered that sulfenyl and thiosulfenyl trithiocarbonates are effective plant defoliants. These compounds can be represented by the general formula

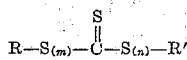

wherein R and R' are organic radicals from the class of alkyl, cycloalkyl, aryl, alkaryl and aralkyl groups; m is an integer from the group of 1, 2 and 3; n is an integer from the group of 2 and 3 and R and R' can be different. A method for the production of these compounds when m is 1 and n is 2 or 3 from the interaction of trithiocarbonates with an organic sulfur halide such as a sulfenyl halide or a thiosulfenyl halide with the elimination of salt is disclosed in U. S. Patent No. 2,574,829 of November 13, 1951, issued on copending application Serial Number 68,737, filed December 31, 1948, by Chester M. Himel et al. The compounds of the present invention when m is 2 and n is 2 can be prepared from the interaction of a dimetallic trithiocarbonate and an alkyl sulfenyl halide

The compounds of the present invention when m is 3 and n is 3 can be prepared from the interaction of a dimetallic trithiocarbonate and an alkyl thiosulfenyl halide

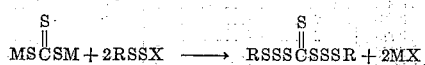

Typical compounds applicable to the present invention when m is 1 and n is 2 include S-methyl-S'-ethylsulfenyl trithiocarbonate, S-tertiary-butyl-S'-tertiary butylsulfenyl trithiocarbonate, S-tertiary-butyl-S'-n-propylsulfenyl trithiocarbonate, S - tertiary- butyl - S'- dodecylsulfenyl trithiocarbonate, S-hexyl-S'-decylsulfenyl trithiocarbonate and the like. Typical compounds applicable to the present invention when m is 1 and n is 3 include S-ethyl-S'-tert-butylthiosulfenyl trithiocarbonate, S-tert-butyl-S'-tert - butylthiosulfenyl trithiocarbonate, S - n-octyl-S'-dodecylthiosulfenyl trithiocarbonate and the like. Typical compounds applicable to the present invention when m is 2 and n is 2 include S-tert-butylsulfenyl-S'-tert-butylsulfenyl trithiocarbonate, S-tert-butylsulfenyl-S'-tert-octylsulfenyl trithiocarbonate. Typical compounds applicable to the present invention when m is 3 and n is 3 include S-tert-butylthiosulfenyl-S'-tert-octylthiosulfenyl trithiocarbonate, S-hexylthiosulfenyl - S' - dodecylthiosulfenyl trithiocarbonate and the like.

These compounds are effective defoliants when applied to plants in any suitable form such as solutions, emulsions, dusts, aerosols, fogs and the like. When fogging methods are employed temperatures in fog generating devices or the like should not be sufficiently elevated to cause possible decomposition of the present defoliants. We have found that it is convenient to apply a trithiocarbonate of the class disclosed as an aqueous emulsion in the form of a spray. The compounds of the present invention are also advantageously adaptable for application by aircraft as mechanical dispersions or mists produced by high velocity air jet devices.

Any suitable carrier or solvent may be employed which is inert with respect to the active defoliating agent and which will not provide a harmful effect on cotton, tomatoes, beans or other crops when applied thereto. Examples of suitable solvents or carriers include straight and branched chain and cyclic paraffinic hydrocarbons containing at least five carbon atoms such as n-pentane, isopentane, cyclohexane, octane and the like or mixtures thereof. Talc, kieselguhr and other inert carriers may be used in preparing dusts. Water may be used advantageously to form emulsions of the compounds of the invention for spraying. When preparing aqueous emulsions, wetting or emulsifying agents such as Triton X 100 (alkyl aryl polyether alcohol), Dresinate 731 (sodium salt of a disproportionated rosin acid), Tween 20 (sorbitan monolaurate polyethylene oxide) and the like are employed in sufficient quantity to stabilize the emulsion. Emulsions containing from one to 10 per cent by weight of the trithiocarbonate are usually preferred.

The defoliants of the present invention may be applied in any desired concentration. We have found that 5 to 50 pounds of trithiocarbonate per acre provides a defoliating action. Usually from about 10 to 20 pounds per acre will provide substantially complete defoliation of cotton.

EXAMPLE I

A test was run wherein 0.025 cc. of S-tert-butyl-S'-tert-butylsulfenyl trithiocarbonate was applied to each leaf of young cotton plants. Defoliation was complete in two days.

EXAMPLE II

The test of Example I was repeated using young beans as test plants. Defoliation was complete in two days.

EXAMPLE III

A five weight per cent aqueous emulsion of S-ethyl-S'-tert-butylsulfenyl trithiocarbonate was prepared using Triton X as an emulsifier at 0.5 per cent. This emulsion was sprayed on cotton plants until wet, a minimum amount running from the leaves. Five to seven days after application the formation of abscission layers at the base of the leaf petioles was observed and defoliation was complete after 14 days. This compound was particularly outstanding in that it removed new leaves as they came out after the plants had been sprayed.

EXAMPLE IV

The experiment of Example III was repeated using S-ethyl-S'-tert-butyl-thiosulfenyl trithiocarbonate. Five to seven days after application the formation of abscission layers at the base of the leaf petioles was observed and defoliation was complete at the end of 14 days.

EXAMPLE V

The experiment of Example III was repeated using S-tert-butyl-S'-tert-butylsulfenyl trithiocarbonate. Five to seven days after application the formation of abscission layers at the base of the leaf petioles was observed and defoliation was complete at the end of 14 days.

EXAMPLE VI

The test of Example III was repeated using S-tert-butylsulfenyl-S'-tert-butylsulfenyl trithiocarbonate. Five to seven days after application the formation of abscission layers at the base of the leaf petioles was observed and defoliation was partially complete at the end of 14 days.

EXAMPLE VII

S-tertiary-butylsulfenyl-S'-tert-butyl trithiocarbonate was applied as a 25 per cent solution in Soltrol 140 (an isoparaffinic hydrocarbon fraction boiling in the range 365–410° F.) to the leaves of large cotton plants which were about three months old. These plants, grown in fertilized soil, were about three feet high and had blossomed and set bolls. Results of applying varying dosages are recorded in the table below.

*The defoliation effect of S-tertiary-butylsulfenyl-S'-tertiary-butyl trithiocarbonate as a 25 per cent solution in Soltrol 140*

| Dosage of Solute Ml. Per Leaf | No. Leaves Treated | Leaves Removed X Days After Application | | |
|---|---|---|---|---|
| | | 2 Days | 3 Days | 4 Days |
| .025 | 8 | 3 | 5 | 6 |
| .012 | 8 | 6 | 6 | 6 |
| .006 | 8 | 3 | 4 | 7 |

EXAMPLE VIII

A series of tests was made on leaves of cotton plants using solutions of S-tertiary-butylsulfenyl-S'-tertiary-butyl trithiocarbonate in various solvents.

| Solutions tested, Solvent | Per Cent[1] | Dosage of Solute Ml. | (4 leaves treated) Leaves removed after X days | | |
|---|---|---|---|---|---|
| | | | 2 Days | 3 Days | 7 Days |
| Soltrol 140 | 10 | .005 | 3 | 4 | 4 |
| | | .0025 | 2 | 3 | 4 |
| Acetone | 10 | .005 | 0 | 3 | 3 |
| | | .0025 | 0 | 2 | 4 |
| Di-tert-octyl disulfide | 10 | .005 | 2 | 4 | 4 |
| | | .0025 | 0 | 2 | 4 |
| None | 100 | .025 | 3 | 4 | 4 |
| | | .01 | 4 | 4 | 4 |

[1] The per cent column indicates the concentration of S-tertiary-butylsulfenyl-S'-tertiary-butyl trithiocarbonate in the particular solvent employed.

EXAMPLE IX

A series of tests was made on cotton and bean plants using solutions of S-tertiary-butylsulfenyl-S'-tertiary-butyl trithiocarbonate in various solvents. An aqueous solution of monosodium cyanamide, a commercial defoliant, was included for comparative purposes. Results of the tests are recorded below.

| Solvent | Per cent[1] | Dosage of Solute Ml. | Total treated leaves removed after X days | | | | | | | |
|---|---|---|---|---|---|---|---|---|---|---|
| | | | Beans (2 leaves treated) | | | | Cotton (4 leaves treated) | | | |
| | | | 3 days | 5 days | 6 days | 7 days | 3 days | 5 days | 6 days | 7 days |
| Di-tert-octyl-disulfide | 1 | .00025 | | 1 | 2 | | | 4 | | |
| | 1 | .0005 | | 1 | 2 | | 2 | 4 | | |
| | 5 | .0013 | 1 | 1 | 2 | | 3 | 3 | 4 | |
| | 5 | .0025 | 2 | | | | 2 | 3 | 4 | |
| Soltrol 140 | 1 | .00025 | | | 2 | | 4 | | | |
| | 1 | .0005 | | 2 | | | 4 | | | |
| | 5 | .0013 | 2 | | | | 2 | 4 | | |
| Water Monosodium Cyanamide | 5 | .0025 | 2 | | | | 3 | 4 | | |
| | 1 | .0005 | | | | 0 | | | | 0 |
| | 1 | .00025 | | | | 0 | | | | 0 |

[1] The per cent column indicates the concentration of S-tertiary-butylsulfenyl-S'-tertiary-butyl trithiocarbonate in the particular solvent employed.

The use of a disulfide as a solvent in this invention is of particular importance in that solvents which contribute to the defoliating effect are difficult to find in view of the peculiarity of defoliation in respect of herbicidal action.

Reasonable variation and modification are possible within the scope of the foregoing disclosure and the appended claims to the invention the essence of which is that sulfenyl and thiosulfenyl trithiocarbonates have been found to be effective as plant defoliating agents.

We claim:

1. A method of defoliating a plant which comprises applying to said plant in an amount sufficient to effect defoliation a compound selected from the group of sulfenyl and thiosulfenyl trithiocarbonates represented by the general formula $$R-S_{(m)}-\overset{\overset{S}{\|}}{C}-S_{(n)}-R'$$

wherein R and R' are organic radicals from the class of alkyl, cycloalkyl, aryl, alkaryl and aralkyl groups; $m$ is an integer from the group of 1, 2 and 3; $n$ is an integer from the group of 2 and 3, and R and R' can be different.

2. The method of claim 1 wherein the plant is a cotton plant.

3. The method of claim 1 wherein the plant is a bean plant.

4. A method according to claim 1 wherein the selected compound is applied in the form of an aqueous emulsion.

5. A method according to claim 4 wherein the emulsion is prepared using an alkyl aryl polyether alcohol.

6. A method according to claim 1 wherein the selected compound is dissolved in an organic sulfide.

7. A method according to claim 6 wherein said organic sulfide is di-tertiary-octyl disulfide.

8. A method of defoliating a plant which comprises applying to said plant S-tert-butyl-S'-tert-butylsulfenyl trithiocarbonate in an amount sufficient to effect defoliation.

9. A method of defoliating a plant which comprises applying to said plant S-ethyl-S'-tert-butylsulfenyl trithiocarbonate in an amount sufficient to effect defoliation.

10. A method of defoliating a plant which comprises applying to said plant S-ethyl-S'-tert-butylthiosulfenyl trithiocarbonate in an amount sufficient to effect defoliation.

11. A method of defoliating a plant which comprises applying to said plant S-tert-butylsulfenyl-S'-tert-butylsulfenyl trithiocarbonate in an amount sufficient to effect defoliation.

12. A method according to claim 11 wherein said S - tert - butylsulfenyl-S'-tert-butylsulfenyl trithiocarbonate is dissolved in di-tertiary-octyl disulfide.

13. A plant defoliating composition comprising as an effective ingredient thereof a compound selected from sulfenyl and thiosulfenyl trithiocarbonates represented by the general formula $$R-S_{(m)}-\overset{\overset{S}{\|}}{C}-S_{(n)}-R'$$

wherein R and R' are organic radicals from the class of alkyl, cycloalkyl, aryl, alkaryl and aralkyl groups; $m$ is an integer from the group of 1, 2 and 3; $n$ is an integer from the group of 2 and 3 and R and R' can be different and said compound is dissolved in an organic solvent.

14. A composition according to claim 13 wherein said compound is dissolved in an organic sulfide.

15. A composition according to claim 13 wherein said compound is dissolved in a paraffinic hydrocarbon solvent.

16. A plant defoliating composition comprising as effective ingredients thereof S-tert-butylsulfenyl-S'-tert-butylsulfenyl trithiocarbonate and di-tertiary-octyl disulfide.

LYLE D. GOODHUE.
CAROLYN E. TISSOL.

REFERENCES CITED

The following references are of record in the file of this patent:

UNITED STATES PATENTS

| Number | Name | Date |
|---|---|---|
| 2,534,099 | Arnold | Dec. 12, 1950 |

OTHER REFERENCES

Annales Agronomiques, January-February 1947, page 90.